(12) United States Patent
Choi

(10) Patent No.: US 11,623,500 B2
(45) Date of Patent: Apr. 11, 2023

(54) PANEL ASSEMBLY FOR VEHICLE MADE OF DIFFERENT MATERIALS WITH DIFFERENT COEFFICIENTS OF THERMAL EXPANSION

(71) Applicants: HYUNDAI MOTOR COMPANY, Seoul (KR); KIA CORPORATION, Seoul (KR)

(72) Inventor: Je-Won Choi, Anyang-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 65 days.

(21) Appl. No.: 17/306,067

(22) Filed: May 3, 2021

(65) Prior Publication Data
US 2022/0219514 A1 Jul. 14, 2022

(30) Foreign Application Priority Data
Jan. 11, 2021 (KR) ................ 10-2021-0003318

(51) Int. Cl.
B60J 5/04 (2006.01)
(52) U.S. Cl.
CPC .......... B60J 5/0456 (2013.01); B60J 5/045 (2013.01)
(58) Field of Classification Search
CPC .......... B60J 5/0484; B60J 5/04; B60J 5/0468; B62D 27/023
(Continued)

(56) References Cited

U.S. PATENT DOCUMENTS

| 6,428,074 B1 * | 8/2002 | Sukegawa | ............... B62D 29/04 296/203.02 |
| 6,749,254 B1 * | 6/2004 | Kleven | ............... B62D 29/001 296/193.11 |

(Continued)

FOREIGN PATENT DOCUMENTS

| DE | 10133419 A1 * | 2/2003 | ............. B60J 5/0416 |
| EP | 1391369 A2 * | 2/2004 | ............. B29C 70/30 |

(Continued)

OTHER PUBLICATIONS

Machine translation DE-10133419-A1.*
Machine translation KR-20170081511-A.*

*Primary Examiner* — Dennis H Pedder
*Assistant Examiner* — Kevin P Weldon
(74) *Attorney, Agent, or Firm* — Morgan, Lewis & Bockius LLP

(57) ABSTRACT

A panel assembly for a vehicle made of different materials with different coefficients of thermal expansion according to various exemplary embodiments of the present invention includes: an external panel 10, an internal panel 20 having the circumference bonded to the circumference of the external panel 10, and made of a material having a coefficient of thermal expansion different from a coefficient of thermal expansion of the external panel 10, and at least one deformation absorption panel 30, 40 connected to at least one of the external panel 10 and the internal panel 20 on the circumferences of the external panel 10 and the internal panel 20, and for absorbing an amount of thermal deformation according to a change in temperatures of the external panel 10 and the internal panel 20 when the external panel 10 and the internal panel 20 are thermally deformed.

19 Claims, 15 Drawing Sheets

(58) Field of Classification Search
USPC .................................... 296/29, 191, 146.5
See application file for complete search history.

(56) References Cited

U.S. PATENT DOCUMENTS

| | | | | |
|---|---|---|---|---|
| 2003/0188492 | A1* | 10/2003 | Bonnett | ................ B60J 5/0483 49/502 |
| 2010/0074678 | A1* | 3/2010 | Jaranson | .............. B62D 29/041 403/267 |
| 2016/0176447 | A1* | 6/2016 | Ko | ........................... B60J 10/80 49/501 |
| 2016/0339966 | A1* | 11/2016 | Iwase | .................. B62D 29/008 |

FOREIGN PATENT DOCUMENTS

| | | | |
|---|---|---|---|
| KR | 10-2016-0077299 A | | 7/2016 |
| KR | 20170081511 A | * | 7/2017 |

* cited by examiner

FIG.4
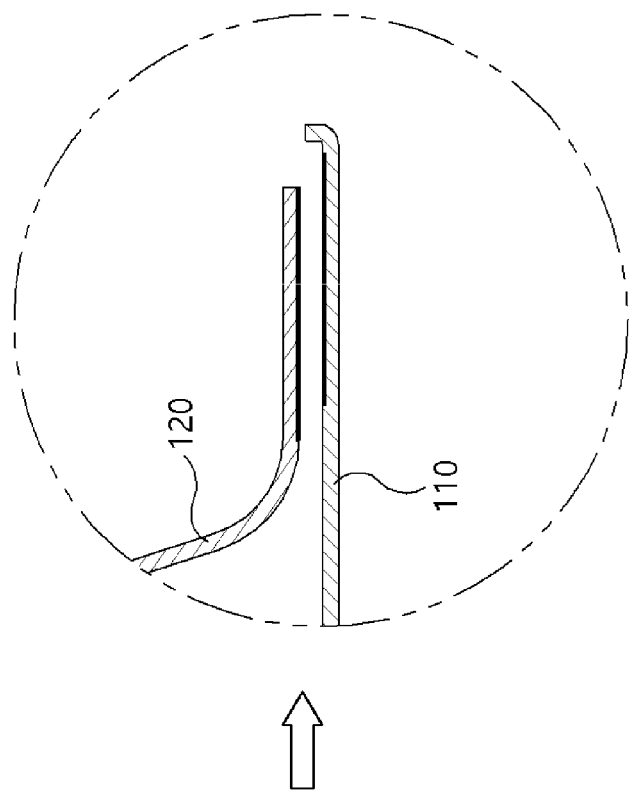
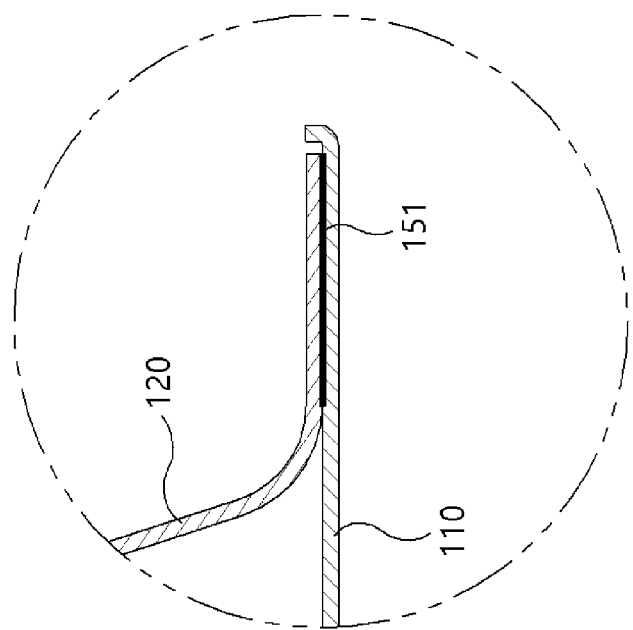

PANEL ASSEMBLY FOR VEHICLE MADE OF DIFFERENT MATERIALS WITH DIFFERENT COEFFICIENTS OF THERMAL EXPANSION

CROSS-REFERENCE TO RELATED APPLICATION

The present application claims priority to Korean Patent Application No. 10-2021-0003318, filed on Jan. 11, 2021, the entire contents of which is incorporated herein for all purposes by this reference.

BACKGROUND OF THE PRESENT INVENTION

Field of the Invention

The present invention relates to a panel assembly for a vehicle, and more particularly, to a panel assembly for a vehicle, which is made of different materials with different coefficients of thermal expansion having a structure of absorbing the thermal expansion deformation between an external panel and an internal panel, which have different coefficients of thermal expansion.

Description of Related Art

A vehicle is provided with a panel assembly in which a plurality of panels are bonded to each other.

For example, a door assembly through which a passenger gets on or off is provided on the side surface of the vehicle, and the door assembly is formed by assembling an external panel and an internal panel.

Generally, the external panel and the internal panel are made of a metallic plate material, and a hemming sealer or a structural adhesive is applied to the circumferences of the external panel and the internal panel, and then the external panel and the internal panel are assembled through the hemming processing.

In recent years, to reduce the weights of the door assembly and the vehicle, one of an external panel 110 and an internal panel 120, for example, the external panel 110 attempts to be made of a synthetic resin material, which is a lightweight material. The circumferences of the external panel 110 and the internal panel 120 are bonded by an adhesive 151 to become a door assembly 100.

When the external panel 110 in the door assembly 100 is made of a synthetic resin material instead of a metallic material, the weights of the door assembly 100 and the vehicle are reduced, improving the fuel efficiency of the vehicle.

However, when the external panel 110 and the internal panel 120 are made of different materials, a coefficient of thermal expansion of the external panel 110 and a coefficient of thermal expansion of the internal panel 120 are different such that an amount of deformation of the external panel 110 and an amount of deformation of the internal panel 120 are different even according to a change in the same temperature.

When the external panel 110 is made of a synthetic resin material, and the internal panel 120 is made of a metallic plate material, the coefficient of thermal expansion of the synthetic resin is greater than that of the metal such that an amount of thermal deformation of the external panel 110 is greater than an amount of thermal deformation of the internal panel 120. Therefore, since an amount of expansion of the external panel 110 is greater than an amount of expansion of the internal panel 120 in the summer, the door assembly 100 is deformed to be convex toward the external panel 110 (see FIG. 5). Since an amount of contraction of the external panel 110 is greater than an amount of contraction of the internal panel 120 in the winter, the door assembly 100 is deformed in the opposite direction thereof. Therefore, the door assembly 100 does not maintain an initial form and is deformed.

When such a phenomenon is repeated and the deformation is accumulated, crack and breakage occur in a portion in which the external panel 110 and the internal panel 120 are bonded such that there is a problem in that the external panel 110 and the internal panel 120 are separated.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a panel assembly for a vehicle made of different materials with different coefficients of thermal expansion, which may absorb thermal deformation according to a change in a temperature to maintain an initial form even if coefficients of thermal expansion of an external panel and an internal panel are different.

A panel assembly for a vehicle made of different materials with different coefficients of thermal expansion according to various exemplary embodiments of the present invention for achieving the object includes: an external panel, an internal panel having a circumference bonded to a circumference of the external panel, and made of a material having a coefficient of thermal expansion different from a coefficient of thermal expansion of the external panel, and at least one deformation absorption panel connected to at least one of the external panel and the internal panel on the circumference of the external panel and the circumference of the internal panel, and configured for absorbing an amount of thermal deformation according to a change in temperatures of the external panel and the internal panel when the external panel and the internal panel are thermally deformed.

A coupling portion protruding from the external panel or the internal panel and having a coupling groove formed on the end portion thereof is formed, and a fitting protrusion is formed on one end portion of the deformation absorption panel and the fitting protrusion is fitted into the coupling groove so that the deformation absorption panel is coupled to the coupling portion.

The inside of the coupling portion extends in a portion of the coupling portion, which is formed with the coupling groove so that a flange portion is formed at the portion of the coupling portion.

The deformation absorption panel is fitted into and coupled to one of the external panel and the internal panel, and fastened to the other of the external panel and the internal panel using a fastening member.

The deformation absorption panel is integrally formed on the external panel or the internal panel.

The deformation absorption panel is formed to have a bent cross section, and consecutively formed with a slit hole deformed upon thermal deformation in a longitudinal direction thereof.

The slit hole is formed so that a width of the deformation absorption panel in a longitudinal direction is greater than a width of the deformation absorption panel in a width direction thereof.

The coefficient of the thermal expansion of the external panel is greater than the coefficient of the thermal expansion of the internal panel.

A coupling portion protruding from the external panel or the internal panel and having a coupling groove formed on the end portion thereof is formed, and the deformation absorption panel is coupled to the coupling portion using a fastening member for fastening one end portion of the deformation absorption panel to the coupling portion.

One deformation absorption panel is provided between the external panel and the internal panel, fitted into and coupled to the external panel, and fastened to the internal panel.

The deformation absorption panel is provided between the external panel and the internal panel to absorb thermal deformation in at least two directions among the longitudinal direction thereof, width direction thereof, and height direction of the vehicle.

The deformation absorption panel includes: a first deformation absorption panel fitted into and coupled to the external panel, and a second deformation absorption panel formed to be bent in a direction opposite to the first deformation absorption panel, fitted into an end portion of the first deformation absorption panel, and fastened to the internal panel.

A slit hole deformed upon thermal deformation is consecutively formed in the longitudinal direction in each of the first deformation absorption panel and the second deformation absorption panel.

A surface of the first deformation absorption panel, which is formed with the slit hole, and a surface of the second deformation absorption panel, which is formed with the slit hole, are perpendicular to each other.

The first deformation absorption panel has a fitting protrusion formed on the end portion thereof and is fitted into a coupling groove formed in the external panel, and the second deformation absorption panel is fastened to the end portion of the internal panel using a fastening member.

The first deformation absorption panel is formed with a fitting groove, and the second deformation absorption panel is formed with a fitting protrusion so that the first deformation absorption panel and the second deformation absorption panel are coupled.

A mounting portion to which the deformation absorption panel is fitted and coupled is formed on an end portion of the external panel or the internal panel, the mounting portion is bonded to the external panel or the internal panel, and an extension is formed on the mounting portion to be parallel to the external panel or the internal panel, and an adhesive is applied to the extension so that the extension is bonded to the external panel or the internal panel.

A sealing member made of a flexible vinyl material is attached to the internal side surface of the deformation absorption panel.

The deformation absorption panel is provided in predetermined sections along the circumferences of the external panel and the internal panel, and in the remaining section, the external panel and the internal panel are bonded to each other using an adhesive.

The panel assembly is a door assembly provided on a side surface of the vehicle to allow a passenger to get on or off.

The panel assembly for the vehicle made of different materials with different coefficients of thermal expansion according to various exemplary embodiments of the present invention having the above configuration may solve the problem in that if the materials of the external panel and the internal panel are different, the coefficients of thermal expansion of the respective panels are different such that the panel assembly is deformed when the temperature is changed.

It is possible to eliminate the difference between amounts of thermal deformation due to the difference between the coefficients of thermal expansion of the respective panels, easily applying the synthetic resin material such as an engineering plastic to the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a cross-sectional diagram illustrating a shape in which an external panel and an internal panel are separated from the circumference of the door assembly according to the related art.

Figure 1:
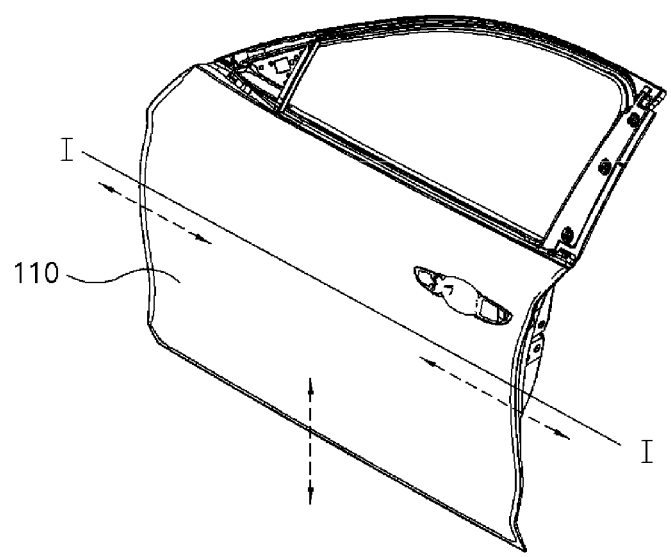
FIG. 1 is a perspective diagram illustrating a door assembly according to the related art.
Figure 2:
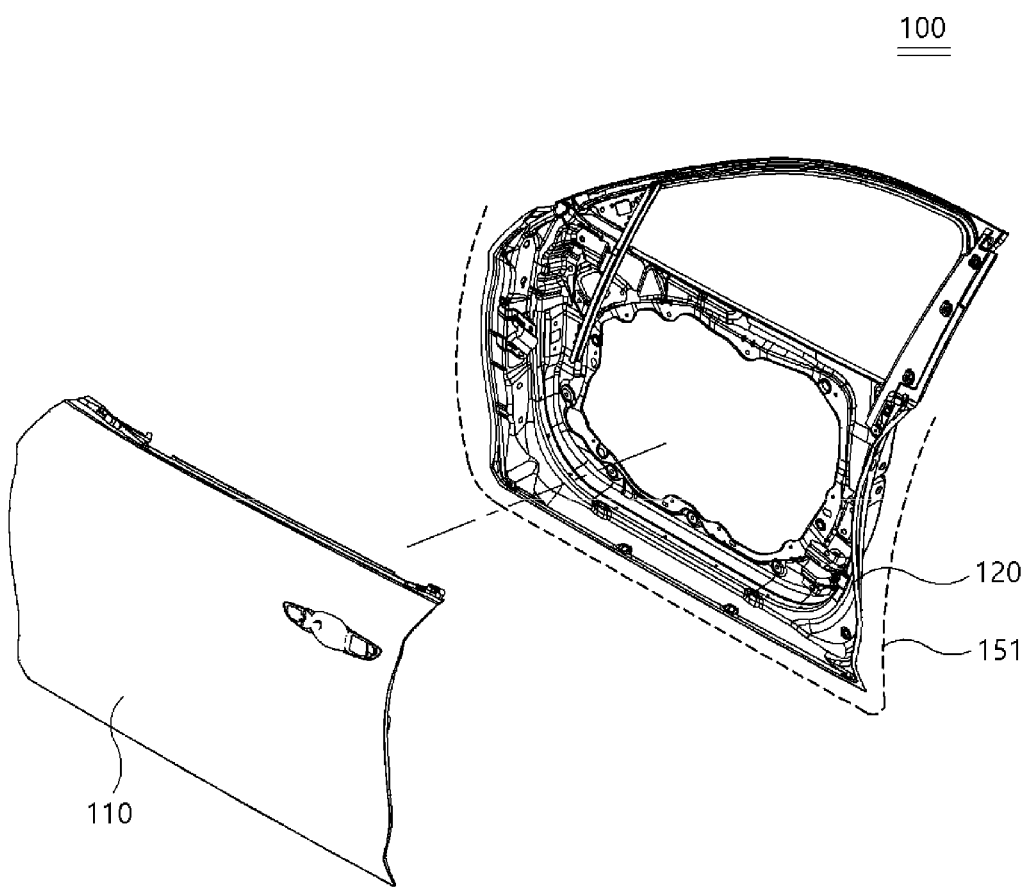
FIG. 2 is an exploded perspective diagram illustrating the door assembly according to the related art.
Figure 3:
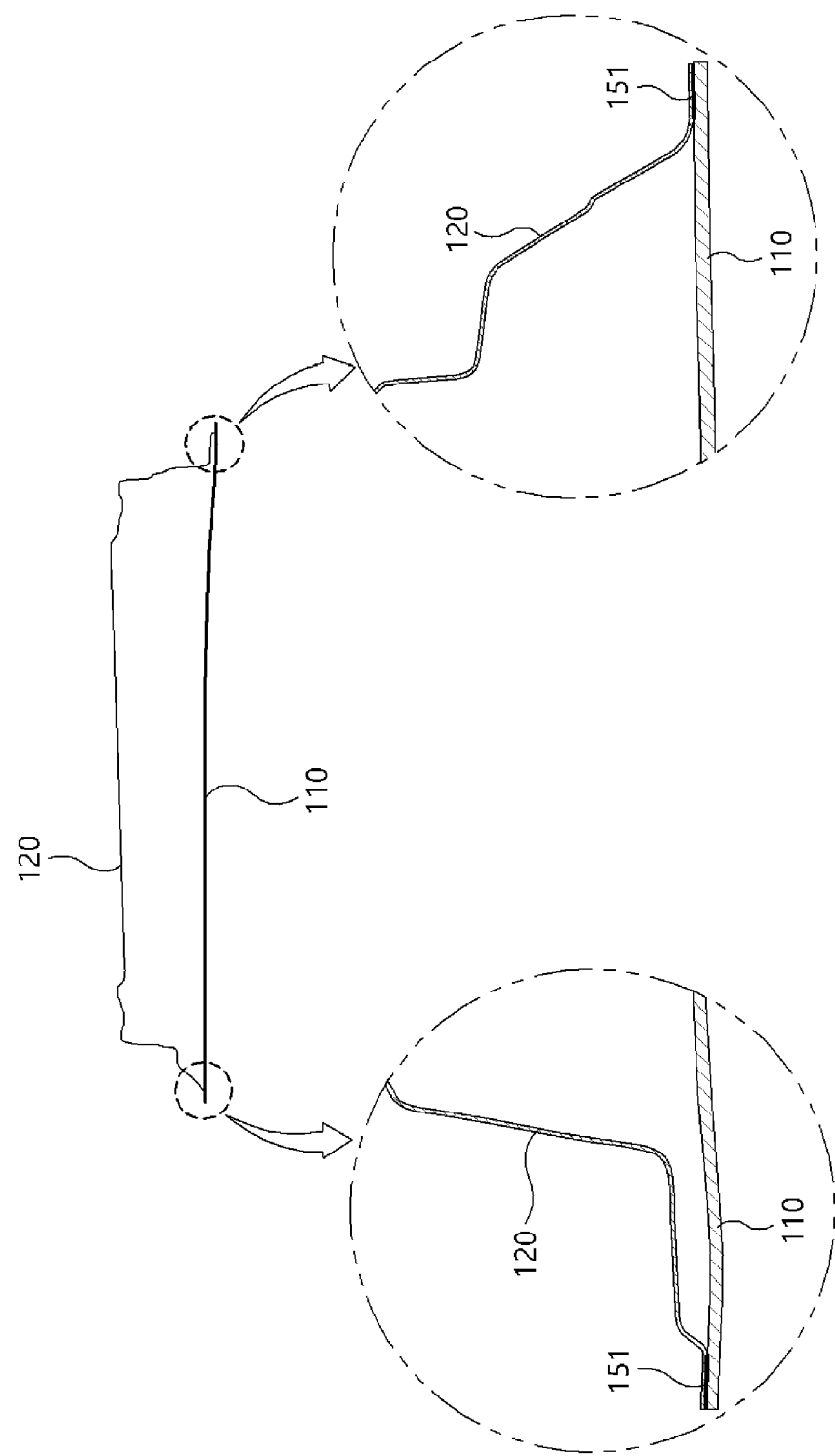
FIG. 3 is a cross-sectional diagram taken along the line I-I illustrated in FIG. 1 illustrating an initial state of the door assembly according to the related art.
Figure 5:
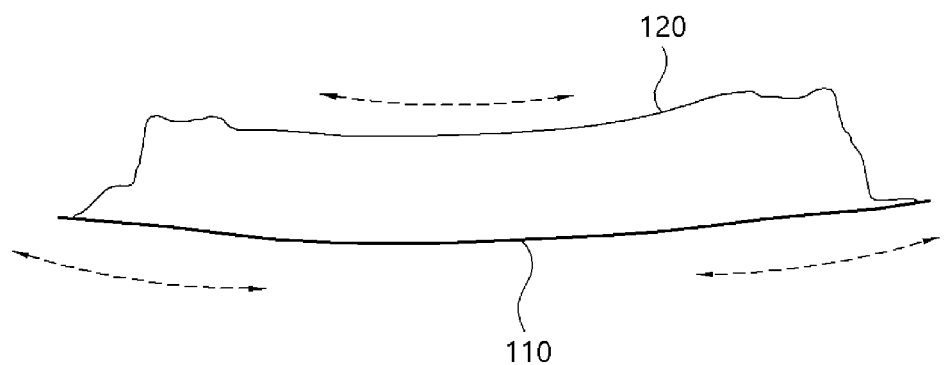
FIG. 5 is a cross-sectional diagram taken along the line I-I illustrated in FIG. 1 with respect to a state where the door assembly according to the related art is thermally deformed.
Figure 6:
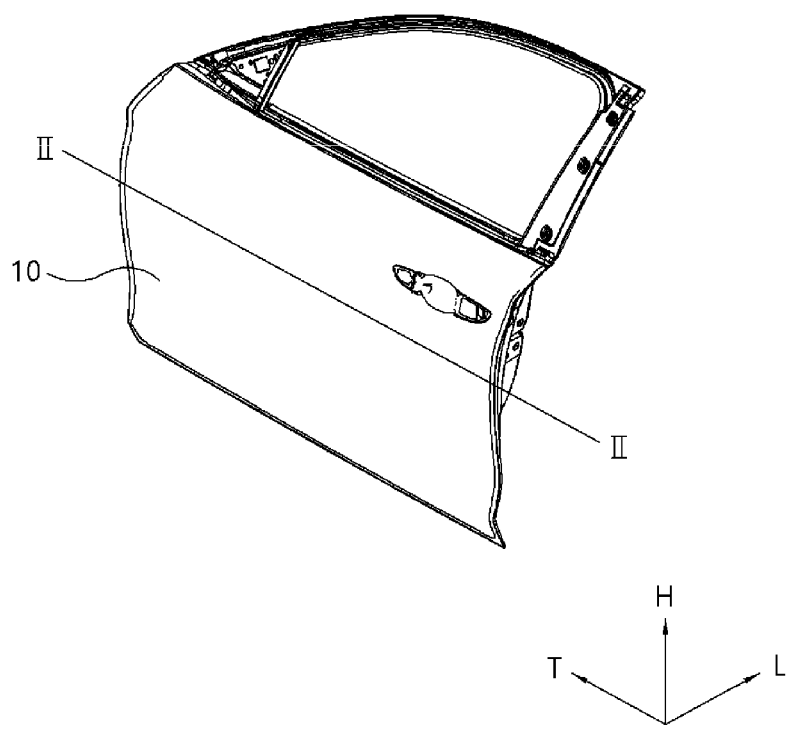
FIG. 6 is a perspective diagram illustrating a panel assembly for a vehicle made of different materials with different coefficients of thermal expansion according to various exemplary embodiments of the present invention.
Figure 7:
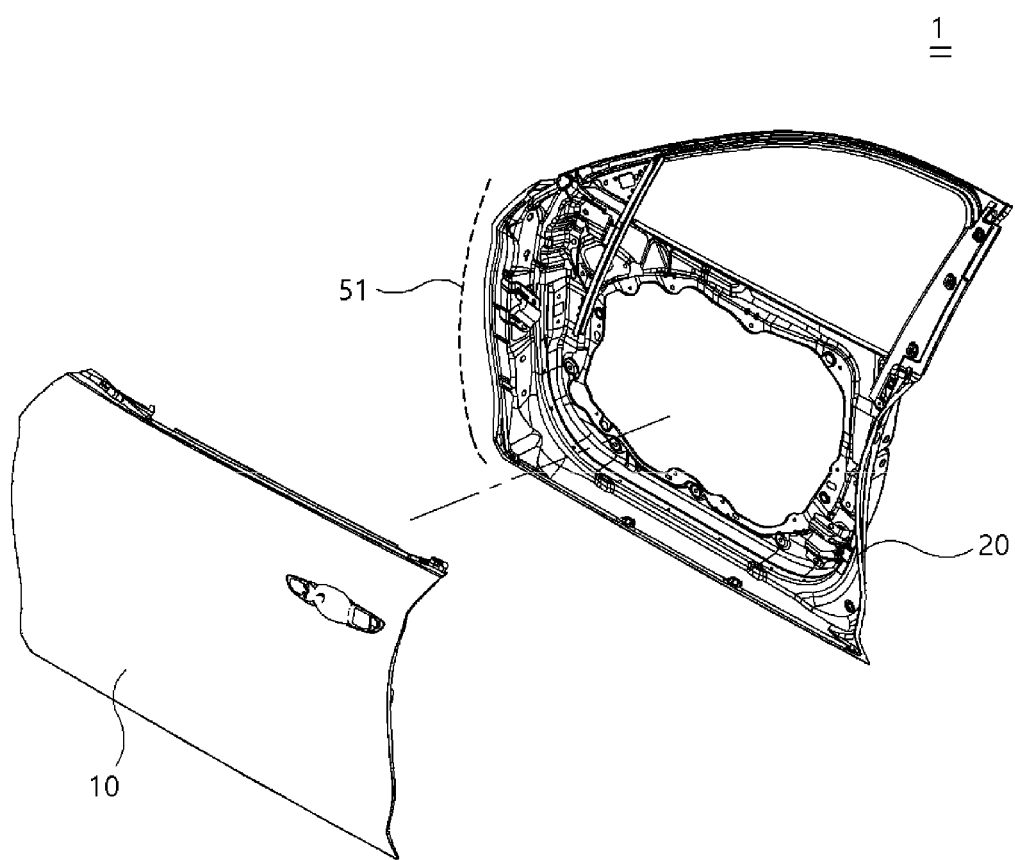
FIG. 7 is an exploded perspective diagram illustrating the panel assembly for the vehicle made of different materials with different coefficients of thermal expansion according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a panel assembly for a vehicle made of different materials with different coefficients of thermal expansion according to various exemplary embodiments of the present invention will be described in detail with reference to the accompanying drawings.

A panel assembly for a vehicle made of different materials with different coefficients of thermal expansion according to various exemplary embodiments of the present invention includes an external panel 10, an internal panel 20 having the circumference bonded to the circumference of the external panel 10, and made of a material having a coefficient of thermal expansion different from a coefficient of thermal expansion of the external panel 10, and at least one deformation absorption panel 30, 40 connected to at least one of the external panel 10 and the internal panel 20 on the circumferences of the external panel 10 and the internal panel 20, and for absorbing an amount of thermal deformation according to a change in temperatures of the external panel 10 and the internal panel 20 when the external panel 10 and the internal panel 20 are thermally deformed.

Here, the absorption of an amount of thermal deformation means the compensation for a difference between an amount of deformation of the external panel 10 and an amount of deformation of the internal panel 20 according to a change in the temperature. If the external panel 10 and the internal panel 20 thermally expand due to an increase in a temperature, an amount of thermal deformation is absorbed such that the side at which the deformation absorption panels 30, 40 expand less expands more, and if the external panel 10 and the internal panel 20 thermally contract due to a decrease in a temperature, an amount of thermal deformation is absorbed such that the side at which the deformation absorption panels 30, 40 contract more contracts less.

Hereinafter, among the panel assembly for the vehicle, a door assembly 1 provided on the side surface of the vehicle to allow the passenger to get on or off will be referred to as an example.

The door assembly 1 is formed by bonding a plurality of panels. That is, the door assembly 1 may include the external panel 10, and the internal panel 20 having the circumference bonded to the circumference of the external panel 10, and made of a material having a coefficient of thermal expansion different from a coefficient of thermal expansion of the external panel 10.

Here, since the coefficients of thermal expansion of the external panel 10 and the internal panel 20 are different, they are thermally deformed by different displacements with respect to a change in the same temperature such that the deformation absorption panels 30, 40 configured for absorbing the thermal deformation is included in the portion to which the external panel 10 and the internal panel 20 is bonded.

Each of the deformation absorption panels 30, 40 is formed in a narrow strip which is connected to one of the external panel 10 and the internal panel 20, respectively. At the instant time, the deformation absorption panels 30, 40 may be formed integrally with one of the external panel 10 and the internal panel 20. However, the deformation absorption panels 30, 40 are preferably fitted into and coupled to one of the external panel 10 and the internal panel 20.

The deformation absorption panels 30, 40 may also be fitted into and coupled to both the external panel 10 and the internal panel 20, but the deformation absorption panels 30, 40 are fitted into and coupled to the external panel 10 side, and fastened to the internal panel 20 by a fastening member such as a fastening bolt 52 or a fastener.

When the deformation absorption panels 30, 40 are coupled to the external panel 10, a coupling portion 11 is formed to protrude from the internal side surface of the external panel 10, a fitting protrusion 31 is formed on one end portions of the deformation absorption panels 30, 40, and the fitting protrusion 31 of the deformation absorption panels 30, 40 is fitted into a coupling groove 12 such that the deformation absorption panels 30, 40 are coupled to the coupling portion 11. To the present end, the coupling groove 12 into which the deformation absorption panels 30, 40 are fitted is formed in the coupling portion 11.

Furthermore, the internal side surface of the portion of the coupling portion 11, which is formed with the coupling groove 12, extends more such that a flange portion 13 is formed. When the deformation absorption panels 30, 40 are fitted into the coupling groove 12, the sealing between the fitting protrusion 31 and the coupling groove 12 is improved by the flange portion 13.

Here, the deformation absorption panels 30, 40 may also be fitted into and coupled to the coupling portion 11, but also coupled thereto using a fastening member. For example, the deformation absorption panels 30, 40 may also be coupled to the coupling portion 11 using a bolt, a fastener, an adhesive, a welding, or the like.

Meanwhile, the coupling portion may be formed on the internal panel 20, and the deformation absorption panels 30, 40 may also be fitted into and coupled to the internal panel 20 side thereof.

The deformation absorption panels 30, 40 are formed to have a bent cross section, and consecutively formed with a slit hole 33 deformed upon thermal deformation in the longitudinal direction of the deformation absorption panels 30, 40, absorbing the thermal deformation.

The slit hole 33 is formed such that a width (w1) of the deformation absorption panels 30, 40 in the longitudinal direction is greater than a width (w2) of the deformation absorption panels 30, 40 in the width direction thereof.

Figure 13A:
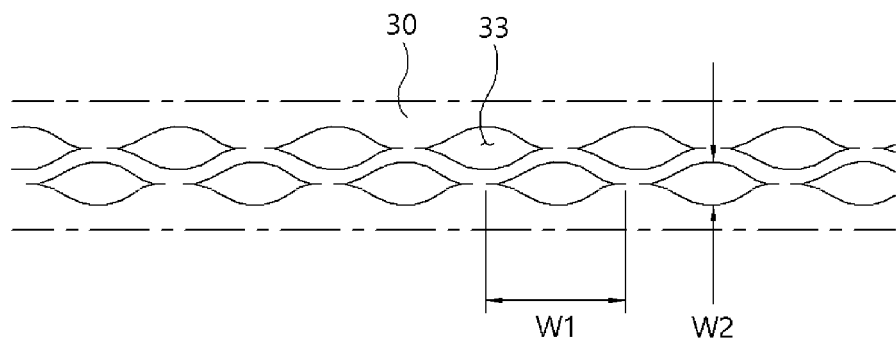
FIG. 13A, FIG. 13B and FIG. 13C are schematic diagrams illustrating deformation states of a slit hole according to a change in a temperature in the panel assembly for the vehicle made of different materials with different coefficients of thermal expansion according to various exemplary embodiments of the present invention.
Figure 13B:
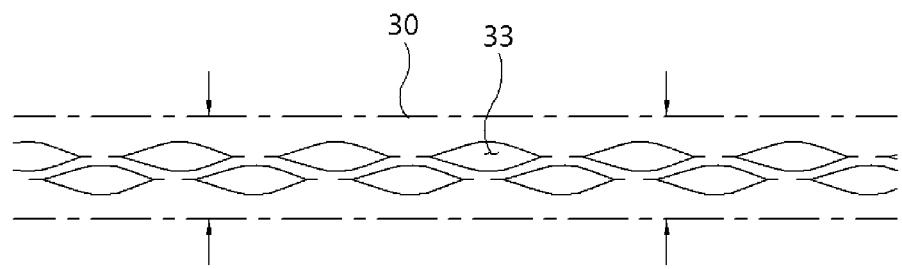
Figure 13C:
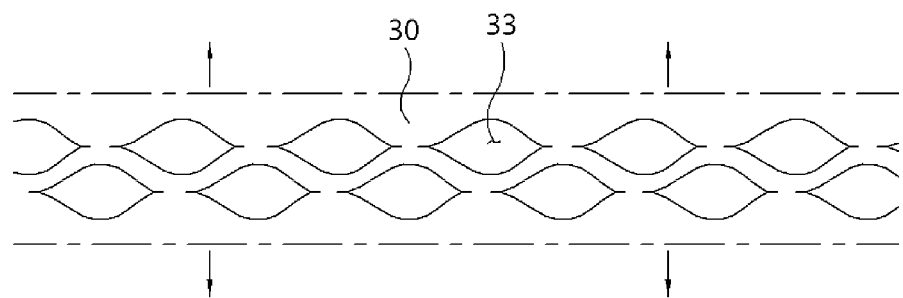

As the slit hole 33 is formed in a plurality of columns in the deformation absorption panels 30, 40, the portion in which the slit hole 33 is formed contracts (see FIG. 13B) or expands (see FIG. 13C) when the temperature is changed.

Therefore, the portion in which the slit hole 33 is formed contracts or expands in the width direction of the deformation absorption panels 30, 40 when the temperature is changed such that a difference between amounts of thermal deformation is absorbed such that amounts of deformation of the external panel 10 and the internal panel 20 are equal to each other when the temperature is changed.

Figure 8:
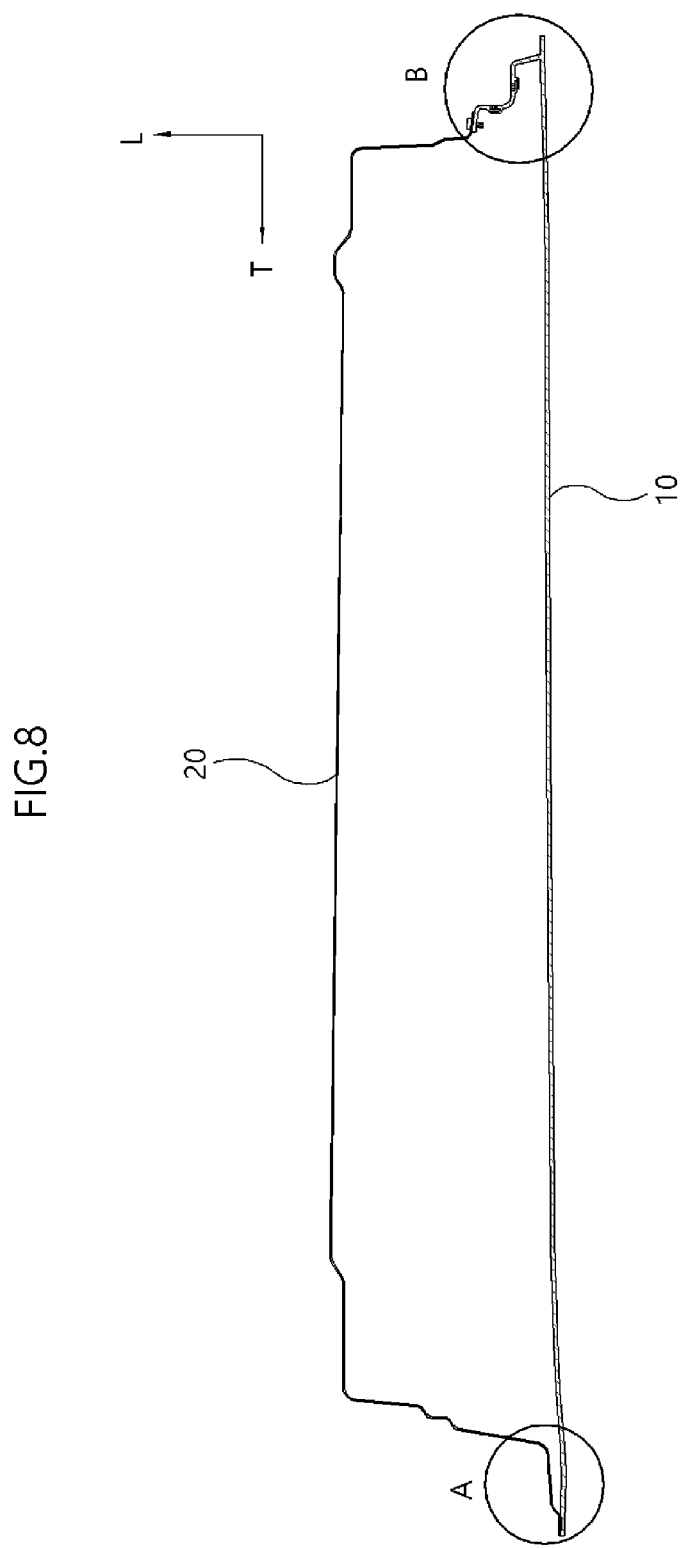
FIG. 8 is a cross-sectional diagram taken along the line II-II illustrated in FIG. 6.

The deformation absorption panels 30, 40 may be applied in some sections along the circumferences of the external panel 10 and the internal panel 20, and in the remaining sections, the external panel 10 and the internal panel 20 may be bonded using an adhesive as in the related art. For example, in FIG. 8, a portion indicated by A is a portion in which the external panel 10 and the internal panel 20 are bonded using an adhesive, and a portion indicated by B is a portion in which the external panel 10 to the internal panel 20 are coupled using the deformation absorption panels 30, 40.

The present invention will be described in more detail.

In the external panel 10 and the internal panel 20 configuring the panel assembly, that is, the door assembly 1, if the coefficient of thermal expansion of the external panel 10 is greater than the coefficient of thermal expansion of the internal panel 20, the deformation absorption panels 30, 40 are coupled by fitting and coupling the fitting protrusion 31 of the deformation absorption panels 30, 40 into and to the coupling portion 11 formed on the external panel 10.

If the internal panel 20 is made of a metallic plate material, and the external panel 10 is made of a synthetic resin material, the coefficient of thermal expansion of the synthetic resin is large such that the coefficient of thermal expansion of the external panel 10 is greater than the coefficient of thermal expansion of the internal panel 20.

In the instant case, the coupling portion 11 is formed on the external panel 10 such that the deformation absorption panels 30, 40 are fitted into and coupled to the coupling portion 11.

Furthermore, a plurality of deformation absorption panels 30, 40 are preferably provided between the external panel 10 and the internal panel 20 to absorb the thermal deformation in at least two directions among the longitudinal direction (T direction), width direction (L direction), and height direction (H direction) of the vehicle.

For example, the deformation absorption panels 30, 40 may include a first deformation absorption panel 30 fitted into and coupled to the external panel 10, and a second deformation absorption panel 40 formed to be bent in the opposite direction of the first deformation absorption panel 30, and fitted into the first deformation absorption panel 30 and fastened to the internal panel 20. The aforementioned slit hole 33 is formed in each of the first deformation absorption panel 30 and the second deformation absorption panel 40 such that the thermal deformation is absorbed by the first deformation absorption panel 30 and the second deformation absorption panel 40.

Of course, only one deformation absorption panel may be provided, fitted into and coupled to the external panel 10, and also fastened to the internal panel 20. However, as described above, a plurality of deformation absorption panels may be preferably provided between the external panel 10 and the internal panel 20 to absorb the thermal deformation in two or more directions.

The first deformation absorption panel 30 is formed in an L shape in which the middle portion of the cross section is bent. A portion of the first deformation absorption panel 30, which is fitted into the external panel 10, is coupled to the coupling portion 11 of the external panel 10 in the longitudinal direction of the vehicle, and the remainder thereof is formed in a form of extending in the width direction of the vehicle.

The end portion of the first deformation absorption panel 30, which is fitted into the coupling portion 11 of the external panel 10, is formed with the fitting protrusion 31 to be easily inserted into the coupling groove 12. The fitting protrusion 31 is fitted into the coupling groove 12 such that the first deformation absorption panel 30 is coupled to the external panel 10.

The end portion opposite to the end portion of the first deformation absorption panel 30, which is formed with the fitting protrusion 31, is formed with a fitting groove 32 such that the second deformation absorption panel 40 is fitted.

Furthermore, a portion of the first deformation absorption panel 30, which is formed with the fitting groove 32, is formed with a flange portion 34 by extending the inside of the first deformation absorption panel 30. The sealing performance of the portion to which the first deformation absorption panel 30 and the second deformation absorption panel 40 are fitted and coupled is complemented by the flange portion 34.

The second deformation absorption panel 40 is formed in a form of being bent in the direction opposite to the first deformation absorption panel 30. That is, the cross section of the second deformation absorption panel 40 is similar to a state of rotating the cross section of the first deformation absorption panel 30 by 180 degrees.

The portion of the second deformation absorption panel 40, which is fitted into and coupled to the first deformation absorption panel 30, is formed with the fitting protrusion 41. The fitting protrusion 41 is fitted into and coupled to the fitting groove 32 of the first deformation absorption panel 30 such that the first deformation absorption panel 30 and the second deformation absorption panel 40 are fitted into and coupled to each other.

Meanwhile, the opposite end portion of the end portion of the second deformation absorption panel 40, which is formed with the fitting protrusion 41, is fastened to the internal panel 20. In a state of overlapping the internal panel 20 and the second deformation absorption panel 40, the fastening member is provided to penetrate the internal panel 20 and the second deformation absorption panel 40 such that the second deformation absorption panel 40 may be fastened to the internal panel 20. The fastening member may be the fastening bolt 52, the fastener, or the like.

Here, a surface of the first deformation absorption panel 30, which is formed with the slit hole 33, and a surface of the second deformation absorption panel 40, which is formed with the slit hole 33, are perpendicular to each other.

Figure 9:
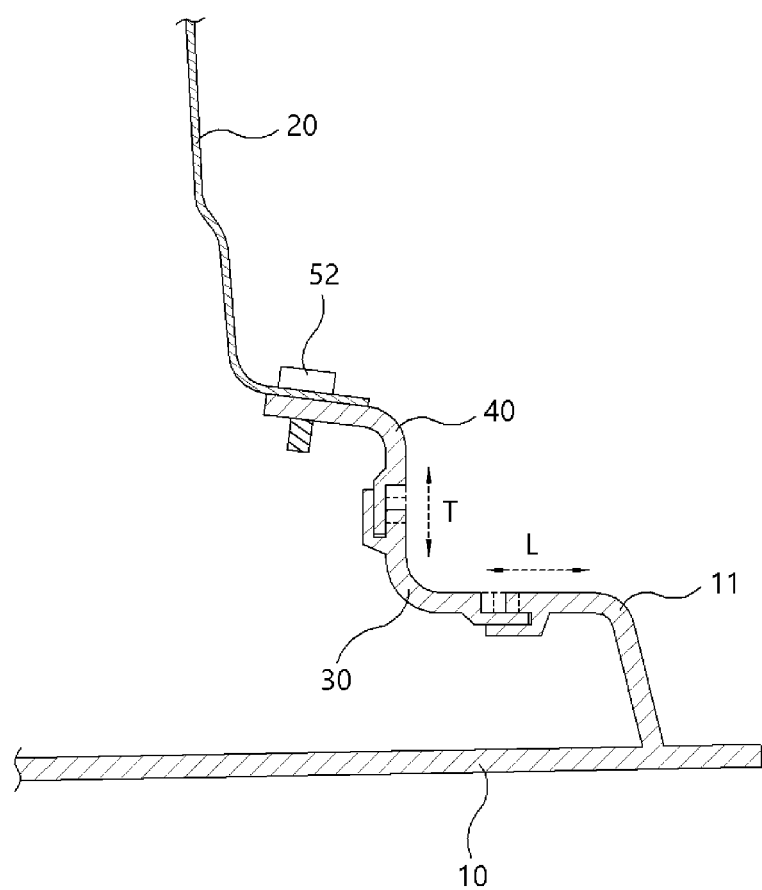
FIG. 9 is an enlarged cross-sectional diagram illustrating a principal portion of a portion in which an external panel and an internal panel are bonded in the panel assembly for the vehicle made of different materials with different coefficients of thermal expansion according to various exemplary embodiments of the present invention.
Figure 10:
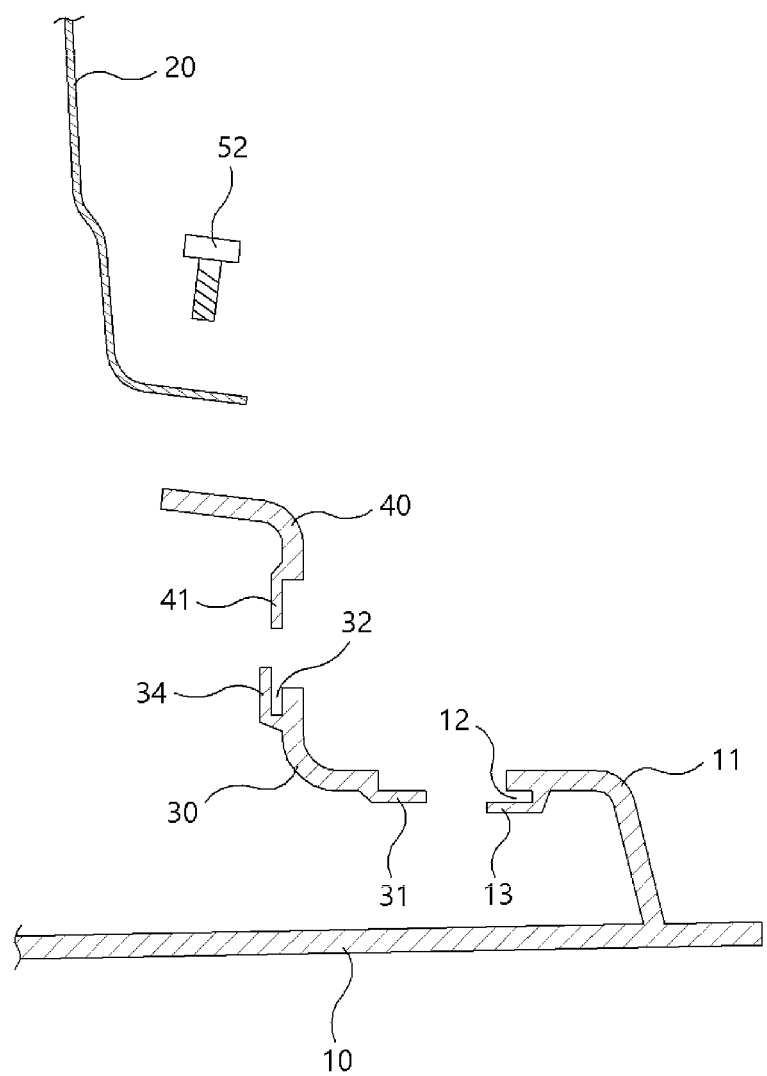
FIG. 10 is an exploded and enlarged cross-sectional diagram illustrating a principal portion of a portion in which the external panel and the internal panel are bonded in the panel assembly for the vehicle made of different materials with different coefficients of thermal expansion according to various exemplary embodiments of the present invention.
Figure 11:
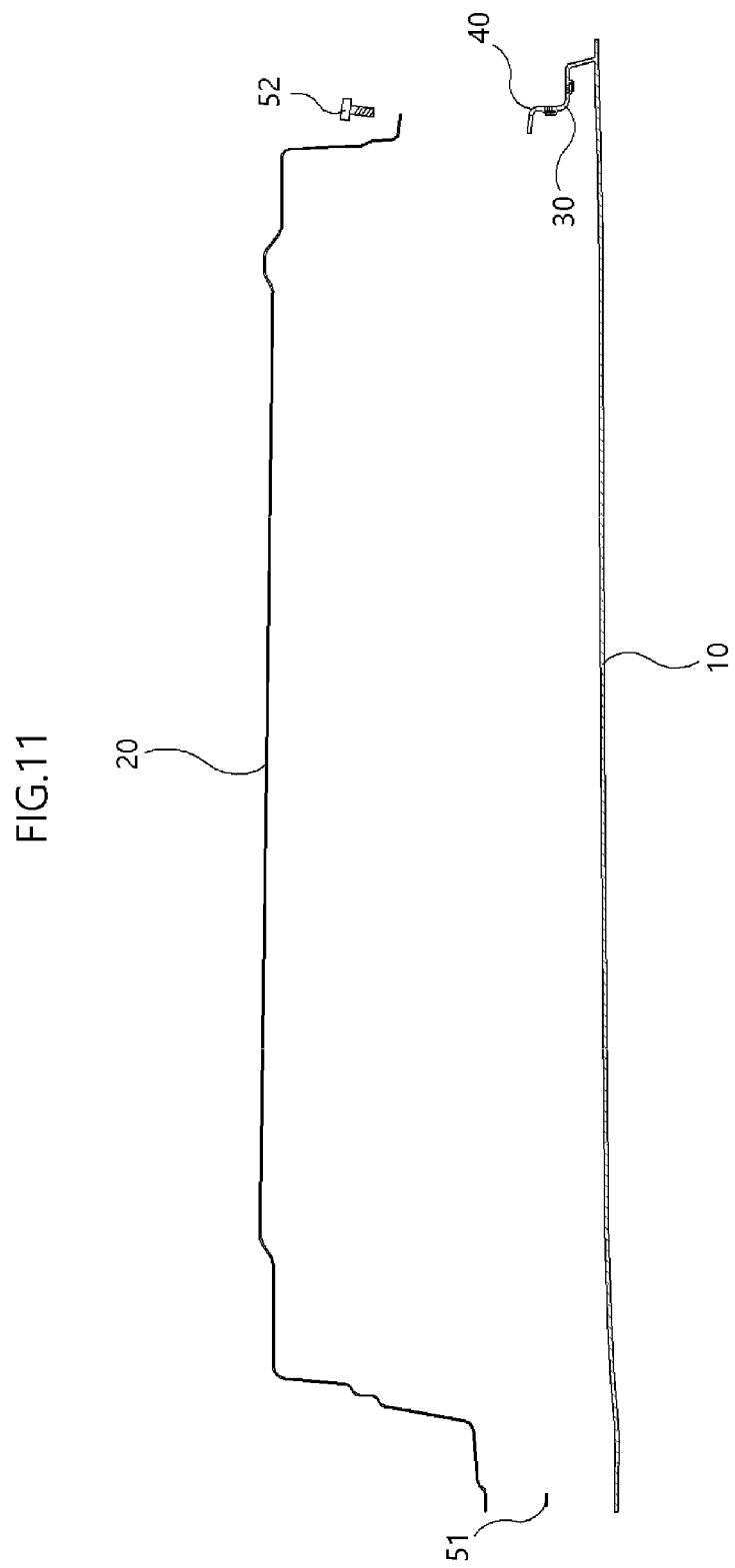
FIG. 11 is an exploded cross-sectional diagram taken along the line II-II illustrated in FIG. 6.
Figure 12:
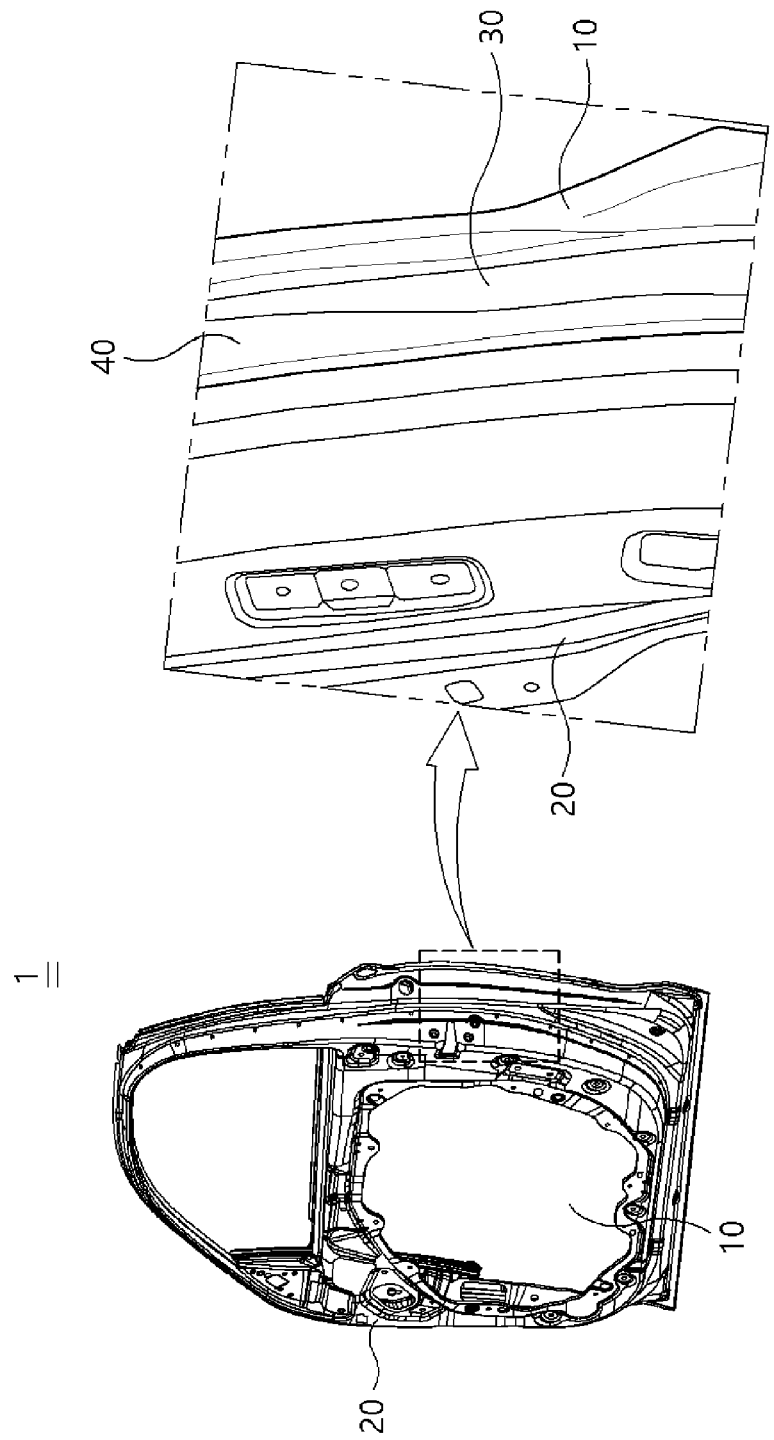
FIG. 12 is an enlarged perspective diagram illustrating a principal portion of the door assembly to which the panel assembly for the vehicle made of different materials with different coefficients of thermal expansion according to various exemplary embodiments of the present invention is applied.

For example, as illustrated in FIG. 9, the slit hole 33 is formed in an L surface (planar surface perpendicular to an L axis) in the first deformation absorption panel 30, and the slit hole 33 is formed in a T surface (planar surface perpendicular to a T axis) in the second deformation absorption panel 40. Therefore, the thermal deformation of the L surface (see an arrow L) is absorbed by the first deformation absorption panel 30, and the thermal deformation of the T surface (see an arrow T) is absorbed by the second deformation absorption panel 40.

Figure 14:
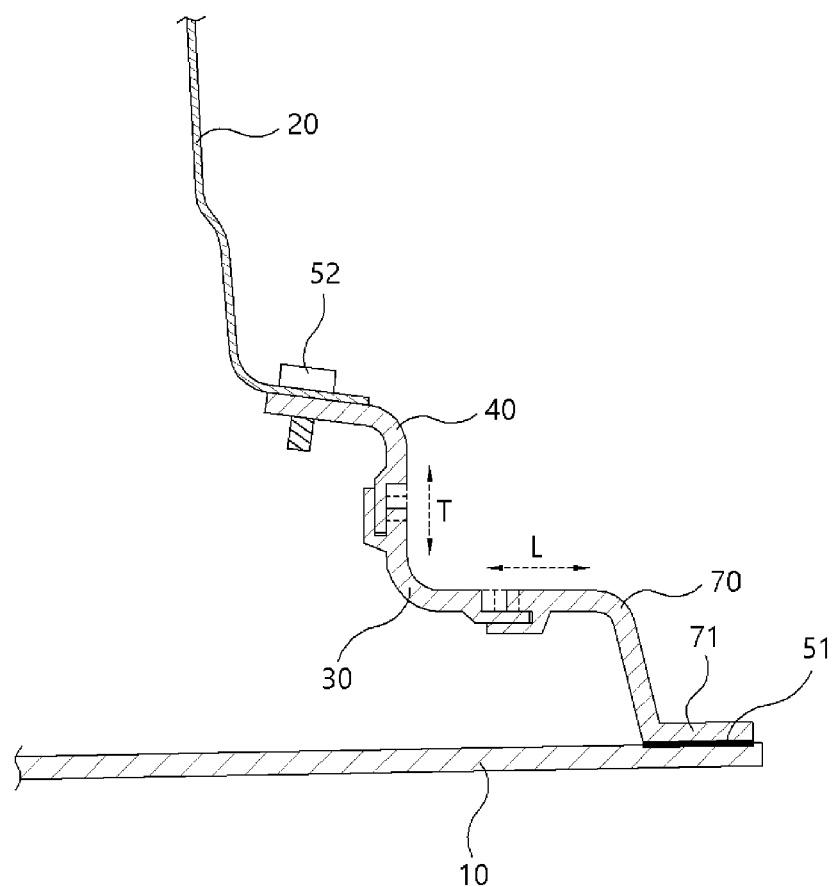
FIG. 14 is an enlarged cross-sectional diagram illustrating a principal portion of a panel assembly for a vehicle made of different materials with different coefficients of thermal expansion according to various exemplary embodiments of the present invention.

FIG. 14 illustrates a panel assembly for a vehicle made of different materials with different coefficients of thermal expansion according to various exemplary embodiments of the present invention.

Unlike the aforementioned exemplary embodiment of the present invention, the exemplary embodiment of the present invention does not integrally form the coupling portion 11 with the external panel 10, but bonds a separate mounting portion 70 to the external panel 10 using an adhesive.

Similar to the shape of the coupling portion 11, a portion of the mounting portion 70, which is coupled to the first deformation absorption panel 30, is formed with the coupling groove 12 and the flange portion 13.

However, an extension 71 is formed such that the portion bonded to the external panel 10 is parallel with the external panel 10, and an adhesive 51 is applied to the extension 71 such that the mounting portion 70 is bonded to the external panel 10.

If the deformation absorption panels 30, 40 are fitted into and coupled to the internal panel 20, the mounting portion 70 is provided to be bonded to the internal panel 20.

Figure 15:
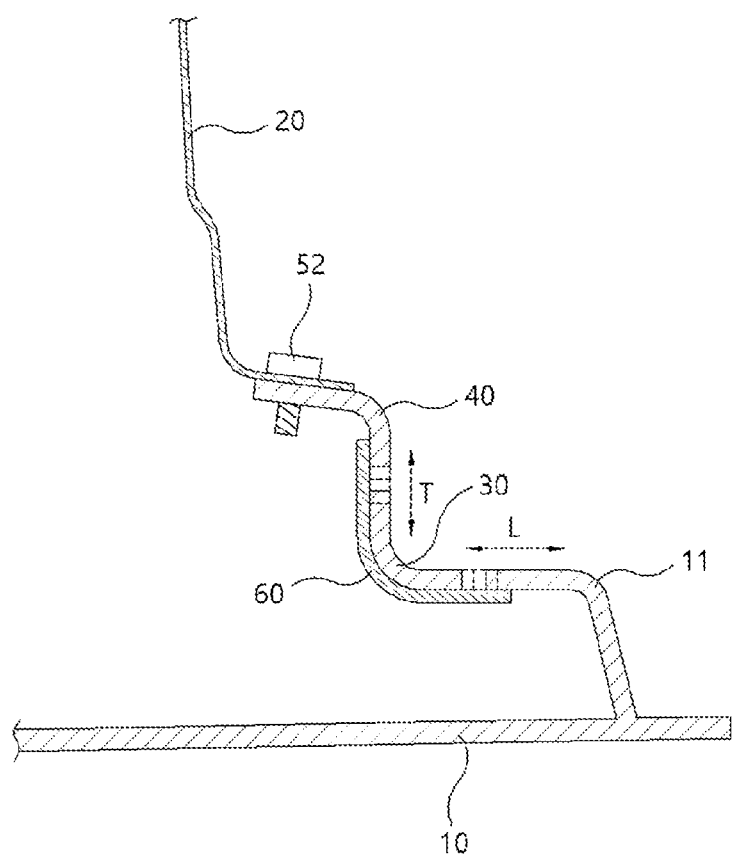
FIG. 15 is an enlarged cross-sectional diagram illustrating a principal portion of a panel assembly for a vehicle made of different materials with different coefficients of thermal expansion according to various exemplary embodiments of the present invention.

FIG. 15 illustrates a panel assembly for a vehicle made of different materials with different coefficients of thermal expansion according to various exemplary embodiments of the present invention.

The exemplary embodiment of the present invention has a sealing member 60 made of a flexible vinyl material attached to the internal side surfaces of the deformation absorption panels 30, 40 for sealing.

The exemplary embodiment of the present invention does not form the flange portion 13 formed on the coupling portion 11 and the flange portion 34 formed on the first deformation absorption panel 30, and attaches the sealing member 60 to the internal side surfaces of the deformation absorption panels 30, 40, performing a sealing function.

Furthermore, in some cases, the first deformation absorption panel 30 and the second deformation absorption panel 40 are integrally formed, and before fastened to the internal panel 20, the sealing member 60 is attached to the first deformation absorption panel 30 and the second deformation absorption panel 40 in a method such as an adhesive, a butyl seal, or a thermal fusion.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A panel assembly for a vehicle made of different materials with different coefficients of thermal expansion, the panel assembly comprising:
   an external panel;
   an internal panel having a circumference bonded to a circumference of the external panel, and made of a material having a coefficient of thermal expansion different from a coefficient of thermal expansion of the external panel; and
   at least one deformation absorption panel formed in a narrow strip and connected to at least one of the external panel and the internal panel on the circumference of the external panel and the circumference of the internal panel, and configured for absorbing an amount of thermal deformation according to a change in temperatures of the external panel and the internal panel when the external panel and the internal panel are thermally deformed,
   wherein the at least one deformation absorption panel has a bent cross section, and consecutively formed with a slit hole deformed upon thermal deformation in a longitudinal direction of the at least one deformation absorption panel.

2. The panel assembly of claim 1, further including:
   a coupling portion protruding from the external panel or the internal panel;
   a coupling groove formed on an end portion of the coupling portion,
   a fitting protrusion formed on one end portion of the at least one deformation absorption panel,
   wherein the fitting protrusion is fitted into the coupling groove so that the at least one deformation absorption panel is coupled to the coupling portion.

3. The panel assembly of claim 2,
   wherein an inside of the coupling portion extends in a portion of the coupling portion, which is formed with the coupling groove so that a flange portion is formed at the portion of the coupling portion.

4. The panel assembly of claim 1,
   wherein the at least one deformation absorption panel is fitted into and coupled to one of the external panel and the internal panel, and fastened to a remaining one of the external panel and the internal panel using a fastening member.

5. The panel assembly of claim 1,
wherein the at least one deformation absorption panel is integrally formed on the external panel or the internal panel.

6. The panel assembly of claim 1,
wherein the slit hole is formed so that a width of the at least one deformation absorption panel in the longitudinal direction of the at least one deformation absorption panel is greater than a width of the at least one deformation absorption panel in a width direction of the at least one deformation absorption panel.

7. The panel assembly of claim 1,
wherein the coefficient of the thermal expansion of the external panel is greater than the coefficient of the thermal expansion of the internal panel.

8. The panel assembly of claim 1, further including:
a coupling portion protruding from the external panel or the internal panel and having a coupling groove formed on an end portion of the coupling portion,
wherein an end portion of the at least one deformation absorption panel is coupled to the coupling portion using a fastening member for fastening the end portion of the at least one deformation absorption panel to the coupling portion.

9. The panel assembly of claim 8,
wherein the at least one deformation absorption panel is provided between the external panel and the internal panel, fitted into and coupled to the external panel, and fastened to the internal panel.

10. The panel assembly of claim 1,
wherein the at least one deformation absorption panel is provided between the external panel and the internal panel to absorb thermal deformation in at least two directions among a longitudinal direction, a width direction, and a height direction of the vehicle.

11. The panel assembly of claim 10, wherein the at least one deformation absorption panel includes:
a first deformation absorption panel, a first end portion of which is fitted into and coupled to an end portion of the external panel; and
a second deformation absorption panel formed to be bent in a direction opposite to the first deformation absorption panel, wherein a first end portion of the second deformation absorption panel is fitted into a second end portion of the first deformation absorption panel, and a second end portion of the second deformation absorption panel is fastened to an end portion of the internal panel.

12. The panel assembly of claim 11,
wherein the slit hole is consecutively formed in a longitudinal direction of the first deformation absorption panel and the second deformation absorption panel in each of the first deformation absorption panel and the second deformation absorption panel, and the slit hole is configured to be deformed upon the thermal deformation.

13. The panel assembly of claim 12,
wherein a surface of the first deformation absorption panel, which is formed with the slit hole of the first deformation absorption panel, and a surface of the second deformation absorption panel, which is formed with the slit hole of the second deformation absorption panel, are perpendicular to each other.

14. The panel assembly of claim 11,
wherein the first deformation absorption panel has a fitting protrusion formed on the first end portion thereof and fitted into a coupling groove formed in the end portion of the external panel, and
wherein the second end portion of the second deformation absorption panel is fastened to the end portion of the internal panel using a fastening member.

15. The panel assembly of claim 11,
wherein the first deformation absorption panel is formed with a fitting groove at the second end portion thereof, and the second deformation absorption panel is formed with a fitting protrusion at the first end portion thereof so that the fitting groove of the first deformation absorption panel and the fitting protrusion of the second deformation absorption panel are coupled to each other.

16. The panel assembly of claim 1,
wherein a mounting portion to which the at least one deformation absorption panel is fitted and coupled is formed on an end portion of the external panel or the internal panel, and
wherein an extension is formed on the mounting portion to be in parallel to the external panel or the internal panel, and an adhesive is applied to the extension so that the extension is bonded to the external panel or the internal panel.

17. The panel assembly of claim 1,
wherein a sealing member is attached to an internal side surface of the at least one deformation absorption panel for sealing.

18. The panel assembly of claim 1,
wherein the at least one deformation absorption panel is provided in predetermined sections along the circumferences of the external panel and the internal panel, and in a remaining section, the external panel and the internal panel are bonded to each other using an adhesive.

19. The panel assembly of claim 1,
wherein the panel assembly is a door assembly provided on a side surface of the vehicle to allow a passenger to get on or off.

* * * * *